(12) United States Patent
Yang et al.

(10) Patent No.: US 10,447,540 B2
(45) Date of Patent: Oct. 15, 2019

(54) DERIVING A NETWORK POLICY FOR AN INDUSTRIAL AUTOMATION NETWORK

(71) Applicant: Cisco Technology, Inc., San Jose, CA (US)

(72) Inventors: Xuechen Yang, Austin, TX (US); Rudolph B. Klecka, III, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 15/094,122

(22) Filed: Apr. 8, 2016

(65) Prior Publication Data

US 2017/0295063 A1 Oct. 12, 2017

(51) Int. Cl.
*G06F 15/177* (2006.01)
*H04L 12/24* (2006.01)

(52) U.S. Cl.
CPC ...... *H04L 41/0893* (2013.01); *H04L 41/0853* (2013.01); *H04L 41/12* (2013.01)

(58) Field of Classification Search
CPC .. H04L 41/0893; H04L 41/0853; H04L 41/12
See application file for complete search history.

(56) References Cited

U.S. PATENT DOCUMENTS

| 9,218,628 | B2 * | 12/2015 | Wang | H04L 67/303 |
| 2004/0117624 | A1 * | 6/2004 | Brandt | H04L 63/1408 |
| | | | | 713/166 |
| 2004/0162996 | A1 * | 8/2004 | Wallace | H04L 63/104 |
| | | | | 726/1 |
| 2006/0085839 | A1 * | 4/2006 | Brandt | G05B 19/4185 |
| | | | | 726/2 |
| 2009/0063501 | A1 * | 3/2009 | Buckler | G06F 11/2025 |
| 2009/0271504 | A1 * | 10/2009 | Ginter | G05B 23/0213 |
| | | | | 709/220 |
| 2010/0145479 | A1 * | 6/2010 | Griffiths | G01D 21/00 |
| | | | | 700/17 |
| 2011/0009984 | A1 * | 1/2011 | Mukhi | G05B 23/0267 |
| | | | | 700/83 |
| 2013/0031037 | A1 * | 1/2013 | Brandt | H04L 63/1408 |
| | | | | 706/12 |
| 2016/0163186 | A1 * | 6/2016 | Davidson | G06Q 50/16 |
| | | | | 340/506 |

FOREIGN PATENT DOCUMENTS

EP 1420317 A2 * 5/2004 ......... H04L 63/1408

* cited by examiner

*Primary Examiner* — Dhairya A Patel
(74) *Attorney, Agent, or Firm* — Behmke Innovation Group LLC; James Behmke; Stephen D. LeBarron

(57) ABSTRACT

In one embodiment, a device receives control logic programmed within at least one controller included within an industrial network. The device also determines a network topology of the industrial network, and derives a network policy for the industrial network based upon, at least in part, the control logic and the network topology.

9 Claims, 6 Drawing Sheets

(TO FIG. 4B)

DERIVING A NETWORK POLICY FOR AN INDUSTRIAL AUTOMATION NETWORK

TECHNICAL FIELD

The present disclosure relates generally to computer networks, and, more particularly, to deriving a network policy for an industrial automation network.

BACKGROUND

Many network communication protocols have been defined over the years based on particular situations, such as for large-scale networks, wireless networks, low-power and lossy networks (LLNs), and, in particular, industrial automation. For instance, an industrial automation network generally has very different characteristics than a typical internet technology network. A typical industrial network is set up and configured as previously drawn on a computer-aided design (CAD) drawing, where once the network is up and running, it generally never changes. That is, capturing a picture of the traffic at any point of the network, one would observe the same traffic pattern with very little variation day after day, year after year. In other words, in a typical industrial automation network, which is designed for communication between machines, not humans, the network structure is rigid, and the traffic pattern is predictable.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives control logic programmed within at least one controller included within an industrial network. The device also determines a network topology of the industrial network, and derives a network policy for the industrial network based upon, at least in part, the control logic and the network topology.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication (PLC) networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
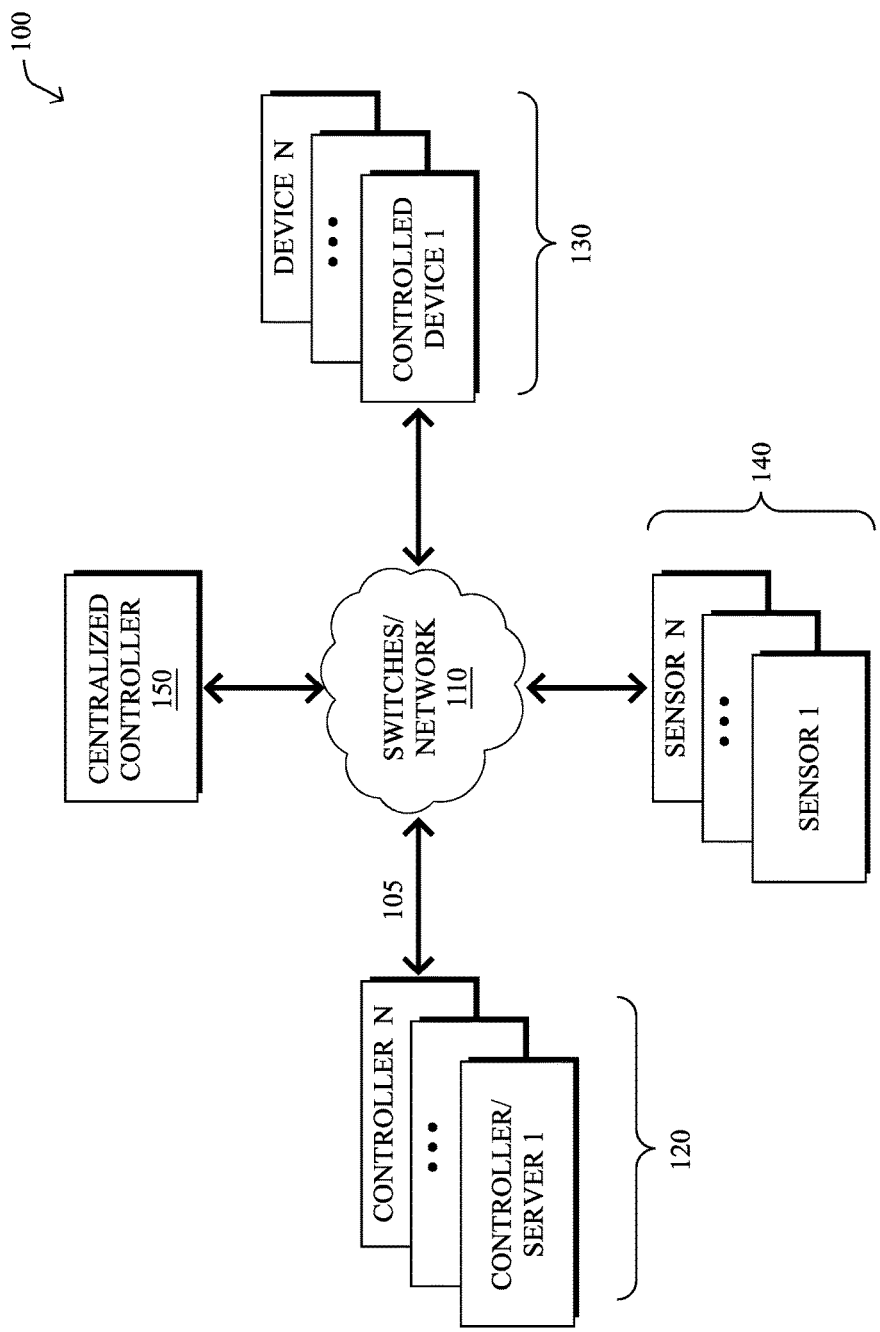
FIG. 1 illustrates an example communication network.

FIG. 1 is a schematic block diagram of a simplified example computer system 100 illustratively comprising links 105 interconnecting one or more devices through a network of routers or switches 110. For example, a set of one or more controllers (or servers) 120 may be interconnected with a set of one or more controlled devices 130 and one or more sensors 140, such as part of an industrial network. In addition, centralized controller 150 (generally, a device, herein) may be in communication with the devices of the network 100 as well.

The devices, generally, may be interconnected by various methods of communication. For instance, the links 105 may be wired links or shared media (e.g., wireless links, PLC links, etc.) where certain devices may be in communication with other devices, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, system 100 is merely an example illustration that is not meant to limit the disclosure.

Data packets (e.g., traffic and/or messages sent between the devices/nodes) may be exchanged among the nodes/devices of the computer system 100 using predefined network communication protocols such as certain known wired protocols, shared-media protocols (e.g., wireless protocols, PLC protocols, etc.), or other protocols where appropriate. In this context, a protocol consists of a set of rules defining how the nodes interact with each other.

According to various embodiments, network 100 may be, or may include, an "Internet of Things" or "IoT" network. In particular, many IoT networks are Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Industrial automation deals primarily with the automation of manufacturing, quality control and material handling processes. Industrial automation networks, in particular, are generally concerned with no-loss on-time delivery of sensed data and/or actuator instructions. As such, many protocols have been developed for the deterministic delivery of transmitted data. Industrial automation networks must also interoperate with both current and legacy systems, and must provide predictable performance and maintainability, and should provide security both from intrusions from outside the plant, and from inadvertent or unauthorized use within the plant.

Figure 2:
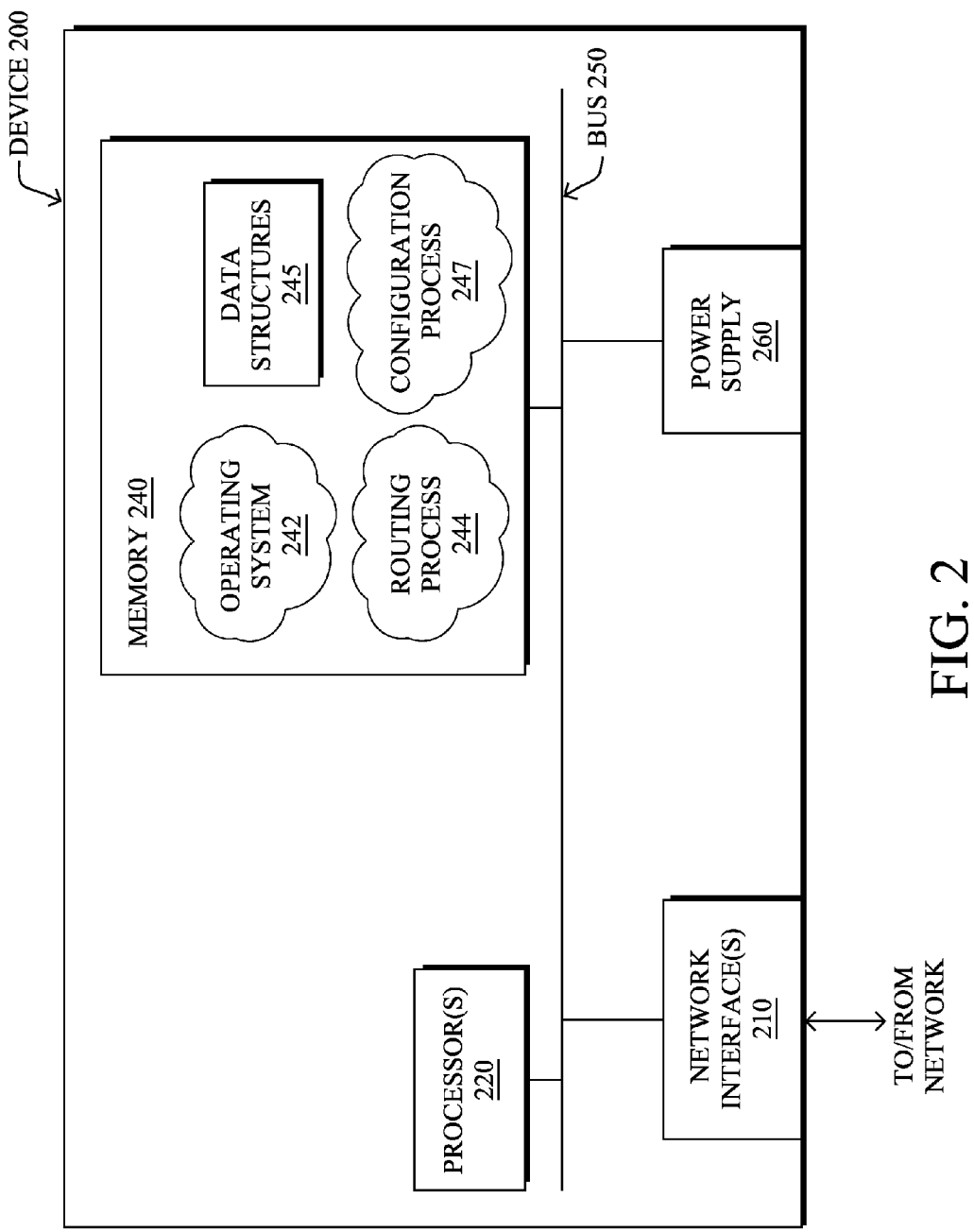
FIG. 2 illustrates an example network device/node.

FIG. 2 is a schematic block diagram of an example node/device 200 that may be used with one or more embodiments described herein, e.g., as any of the nodes/devices shown in FIG. 1 above, particularly as the centralized controller 150 as described herein. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise a routing process 244, and an illustrative configuration process 247, as described herein. Note that while routing process 244 is shown in centralized memory 240, alternative embodiments provide for the process to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 include computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. As noted above, industrial automation networks are generally deterministic networks, providing predictable performance and maintainability, and as such are generally proactively configured/routed.

Figure 3:
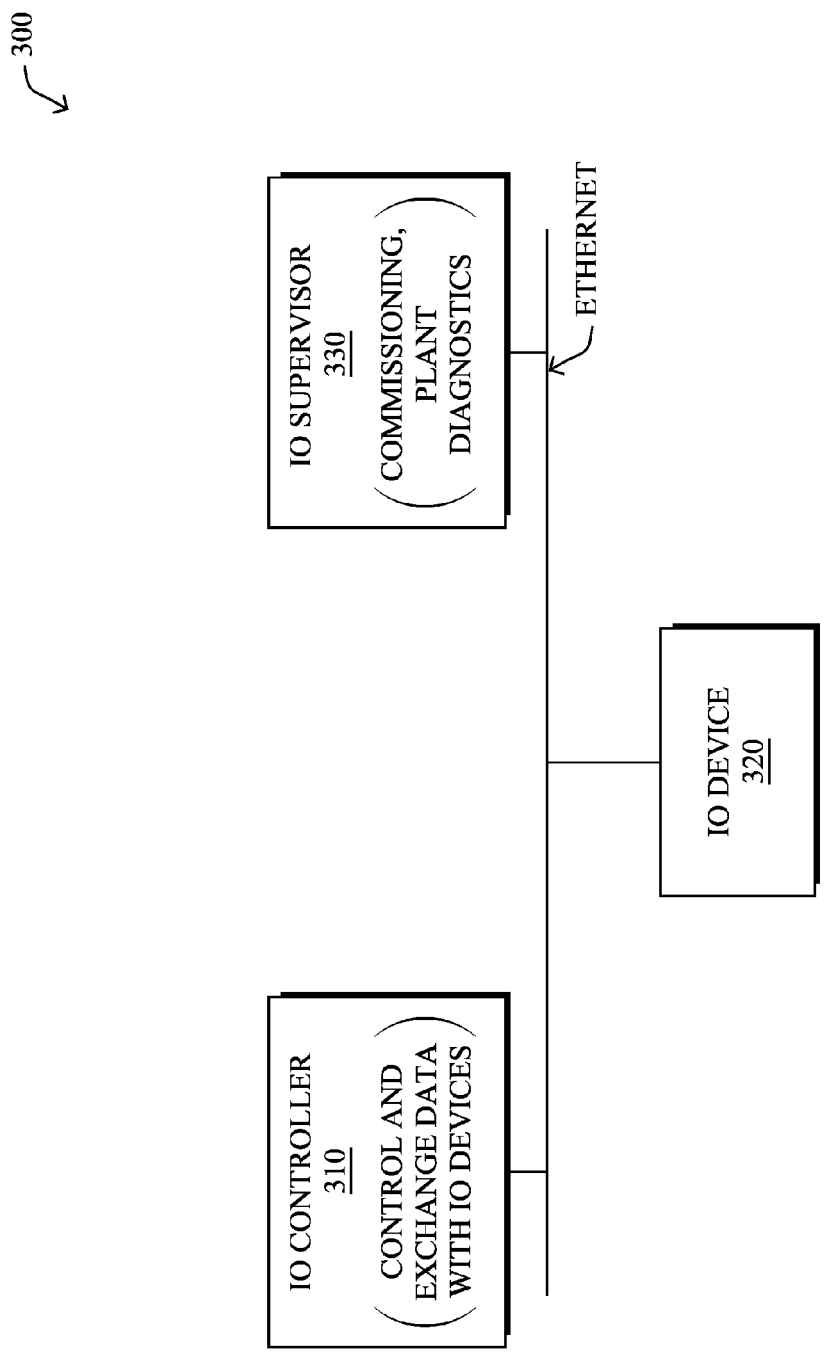
FIG. 3 illustrates an example view of the communication network as an example industrial automation network.

As shown in FIG. 3, a typical system components of an industrial I/O (or simply "IO") system 300 (a specific implementation/component of network 100) consists of three components:
  IO Controller 310—Controls the automation task;
  IO device 320—field device monitored and controlled by IO controller (may consist of a several modules and sub-modules); and
  IO Supervisor 330—Software on device/PC to set parameters and diagnose individual IO devices.

In an example industrial network, an Application Relation (AR) is established between an IO Controller and an IO Device. These ARs are used to define Communication Relations (CR) with different characteristics for the transfer of parameters, cyclic exchange of data and handling of alarms. Also, each device/module within an industrial automation network has three addresses: MAC address, IP address, and device name (a logical name for the module within the total configuration). Generally, for allocation of the IP address, subnet mask, and default gateway two methods are defined: Discovery and Configuration Protocol (DCP); and Dynamic Host Configuration Protocol (DHCP).

As noted above, an industrial automation network generally has very different characteristics than a typical internet technology network, and is often set up as configured in advance, remaining unchanged thereafter. Although industrial networks have been implemented for many years, there are still inefficiencies with the design of an industrial automation network, such as the ability to derive full knowledge of the network setup, the traffic model, and operation from Control Data Configuration and Control Logic, which is the same logic that is written into Automation Controllers (e.g., programmable logic controllers (PLCs), programmable automation controllers (PACs), remote terminal units (RTUs), etc.).

Deriving a Network Policy for an Industrial Automation Network

Combined with the ability of understanding network topology and individual device capability, the system herein can automate network setup and configuration, and ultimately ensure the automation process and operation being carried out safely and securely as designed.

Generally, there are two important inputs to the proposed system: Tag Configuration and Control Program Logic. "Tag Configuration" contains the input and output I/O data set of the control systems, including the tag name, tag producer (e.g., an I/O block), tag consumer(s) (e.g. a PLC), location of the device producing the tag (e.g., MAC and IP address), tag type, and tag value properties (e.g., range, data type, etc.). In most automation systems, device capability and mapping (e.g., an Electronic Data Sheet (EDS) in the Common Industrial Protocol (CIP) and EtherNet/IP ecosystem) may also be included as part of the Tag Configuration input.

As an example, a tag is industrial automation data generated or requested by a certain device, such as a temperature sensor measuring the environment (an output tag) or a cooling device requesting the temperature (an input tag). That is, an example temperature output tag may comprise a temperature sensor address, and optionally a list of who needs to access the data (e.g., the cooling device). On the other hand, a temperature input tag may comprise a cooling device address, whether the data is to be polled or pushed, at what interval, etc. Additionally, a tag can be networked (e.g., transferred on an IP network as a packet) or transmitted via a direct port connection.

"Control Program Logic", on the other hand, refers to the control programs written into industrial controllers to perform different operations. Such logic used to be programmed using a language called RLL (Relay Ladder Logic) or just LL (Ladder Logic). As microprocessors have become more powerful, notations such as sequential function charts and function block diagrams can replace ladder logic for some limited applications. Modern PLCs can now be programmed using programming language that resembles BASIC or C or other programming language with bindings appropriate for a real-time application environment. For example, IEC 61131-3:2013 specifies the syntax and semantics of a unified suite of programming languages for programmable controllers (PCs). This suite consists of two textual languages, Instruction List (IL) and Structured Text (ST), and two graphical languages, Ladder Diagram (LD) and Function Block Diagram (FBD).

As an example, access to the data (defined in the tags) can be based on control logic, such as Boolean logic, cause/effect, and so on. For instance, an input tag-based control logic may be something like "IF temp >X", where the output tag-based control logic may respond "THEN increase cooling". For the greatest efficiency, each industrial network thus needs to be specifically mapped to "connect the dots" of the particular industrial network's operation (e.g., "every ten seconds, transmit two bytes of temperature from this device to that device, and in response to temp >X, increase cooling", and so on).

Due to the complexity of the overall system, and the fact that different algorithms and rule engines needed to derive network segmentation, network traffic model, and security policy configuration, there are many aspects that are important to the proper design and implementation of an industrial automation network.

The techniques herein, in particular, address the fact that the biggest obstacle to Internet Technology (IT) and Operational Technology (OT) convergence is the division between management systems. That is, industrial operation people view the network as wires and they don't want to care how Quality of Service (QoS), Security, and other network services are configured. The proposed system herein, however, can greatly simplify how they manage the Industrial Automation Network, and ensure the safety and security of the operations. For instance, taking inputs from a self-discovered Network Topology, Control Program Logic, and Tag Configuration, the system can auto-determine traffic patterns, bandwidth requirements, and latency constraints on the network for each session, automatically establishing zones and conduits, virtual local area networks (VLANs), virtual private networks (VPNs), and access control list (ACL) configurations for all networking elements.

Specifically, according to one or more embodiments of the disclosure as described in detail below, a device receives control logic programmed within at least one controller included within an industrial network. The device also determines a network topology of the industrial network, and derives a network policy for the industrial network based upon, at least in part, the control logic and the network topology.

Illustratively, the techniques described herein may be performed by hardware, software, and/or firmware, such as in accordance with the configuration process 247, which may contain computer executable instructions executed by the processor 220 to perform functions relating to the techniques described herein, e.g., in conjunction with other suitable processes (e.g., as inputs and/or outputs to the configuration process 247, accordingly).

Operationally, the procedures herein focus on how to derive traffic patterns, session information, bandwidth requirements, latency constraints, and so on from known Control Program Logic. In general, there are three pieces of information used as inputs to the proposed system:

Control Logic programmed into the Controllers (e.g., IEC 61131-3 Structured Text);

Network Topology (self-discovered, or configured, etc.); and

Tag Configuration (including individual device capability, e.g., EDS).

Each of these pieces of information can be stored and aggregated, such that the system herein can build the network and policy model, derive required QoS and security policy configurations, provision/configure network elements, monitor network activity, and stop any traffic from passing unless it matches the derived network model.

Figure 4A:
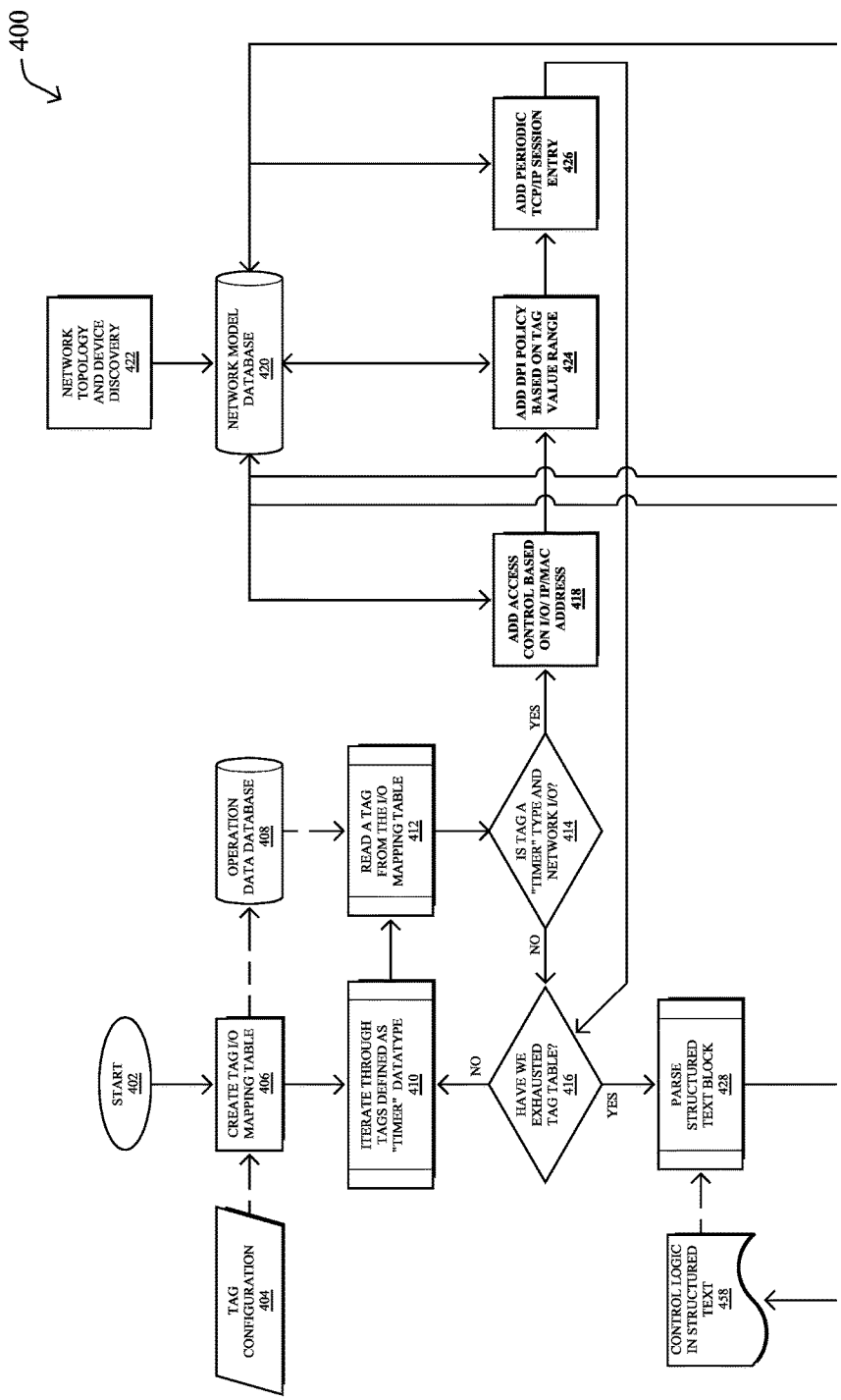
FIGS. 4A-4B illustrate an example simplified procedure for configuring the design of an industrial automation network, particularly for mapping tags and I/O module configuration to network design.
Figure 4B:
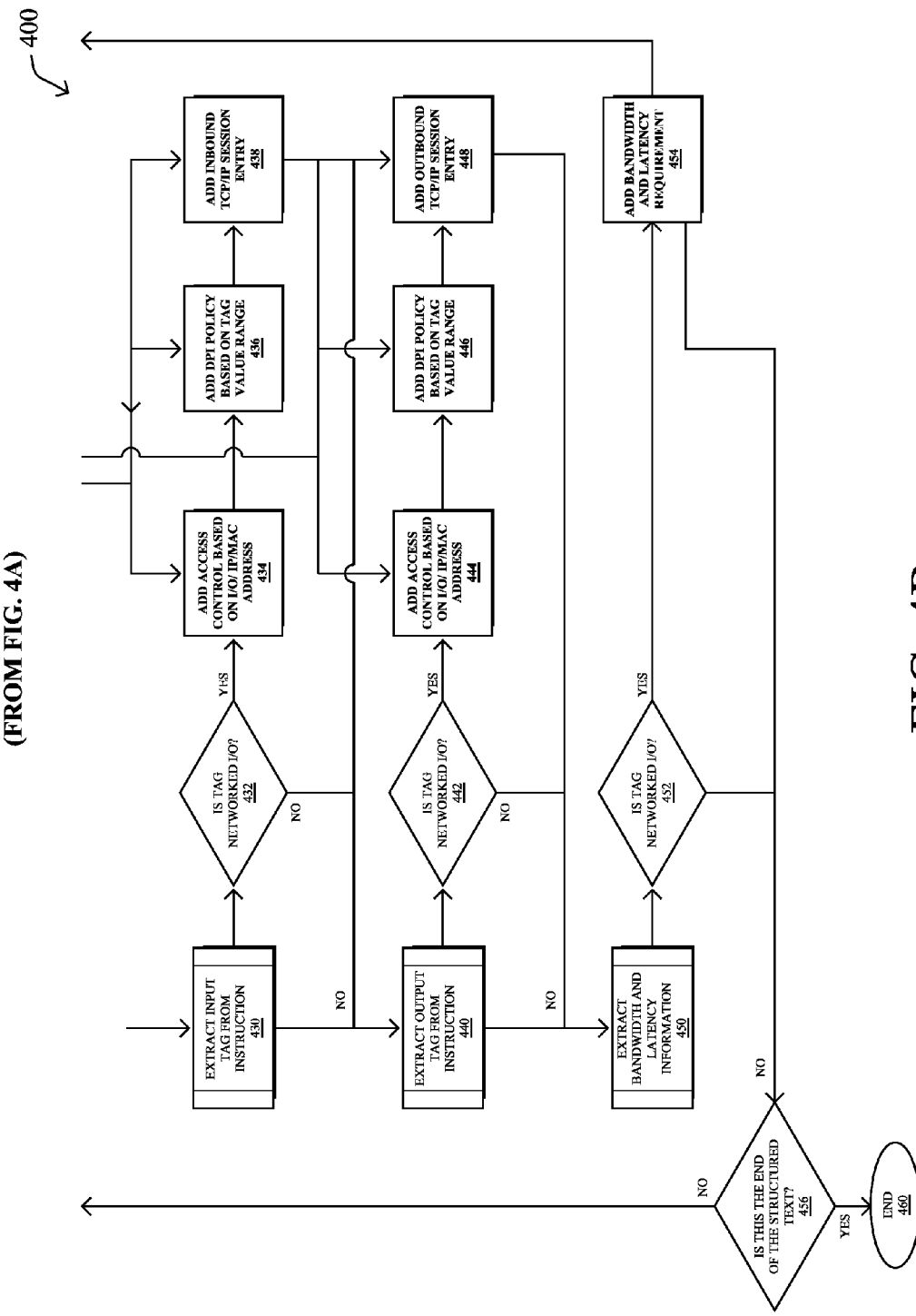

FIGS. 4A-4B illustrate an example simplified procedure for configuring the design of an industrial automation network in accordance with one or more embodiments described herein, particularly for mapping tags and I/O module configuration to network design (e.g., the high-level work flow on how to map such inputs above into a Network Model with Access Control Policy, deep packet inspection (DPI) Configuration, and pre-determined Behavior information). (Notably, the procedure 400 as shown is merely one example, and is not meant to be limiting to the scope of the present disclosure. That is, procedure 400 as shown may be more specific than necessary to work on all Control Programs, but those skilled in the art will understand from reading this example how to derive a more generic framework).

The procedure 400 may start at step 402 (in FIG. 4A), and continues to take tag configuration 404 as an input to step 406, where a tag I/O mapping table is created. This tag I/O mapping table may be used to update the operation data database 408, and leads to the beginning of the iterations through tags defined as "timer" data type in step 410. For each iteration, step 412 reads a tag from the I/O mapping table (from database 408), and if the tag is not a "time" type and network I/O in step 414, then the procedure determines whether the tag table has been exhausted in step 416 (returning to step 410 if not, otherwise moving to step 428 described in FIG. 4B below).

For each tag that is a "time" type and network I/O in step 414, then in step 418 access control is added to the network model database 420 based on the I/O IP/MAC address. (Note that the network model database 420 is also built based on the network topology and device discovery (step 422), mentioned herein.) In addition, in step 424 a DPI policy based on tag value range is also added to the network model database 420, as well as a periodic TCP/IP session entry in step 426. The above steps continue until the tag table has been exhausted in step 416, in which case the procedure 400 continues to FIG. 4B at step 428.

In particular, in FIG. 4B, a structured text block may be parsed in step 428. In step 430, then, input tags may be extracted from instructions. If the tag is a networked I/O in step 432, then in step 434 access control is added to the network model database 420 (shown in FIG. 4A) based on the I/O IP/MAC address. Also, in step 436 a DPI policy based on tag value range is also added to the network model database 420, as well as a periodic TCP/IP session entry in step 438. Subsequently, in step 440, output tags may be extracted from instructions. Again, if the tag is a networked I/O in step 442, then in step 444 access control is added to the network model database 420 (shown in FIG. 4A) based on the I/O IP/MAC address, and in step 446 a DPI policy based on tag value range is also added to the network model database 420, as well as a periodic TCP/IP session entry in step 448. Lastly, in step 450, bandwidth and latency information may be extracted, where if in step 452 the tag is networked I/O, then in step 454 the bandwidth and latency requirements are added to the network model database 420.

If at this point there is more structured text in step 456, then the procedure returns to the control logic in structured text (item 458) to continue parsing the structure text block in step 428. (Note that the Structured Text based Control Logic contains the instructions that enable PLCs to handle different input data and possibly produce output data.) If, on the other hand, in step 456 the end of the structured text has been reached, then the procedure 400 ends in step 460, with a completed network model database 420, accordingly.

Based on the techniques herein, therefore, by inferring the characteristics of the network (traffic patterns, etc.), protocol flows (the tags) or other Industrial Automation I/O parameters and programs may be transformed into a network design (boxes, port connections, etc.) and configuration (e.g., CLI) of the network, accordingly. In general, this is relevant to different types of IoT domains (Industrial, Energy, etc.), and may be used for "Zero Touch Deployment", where an administrator need not be both an industrial expert and a networking expert.

Figure 5:
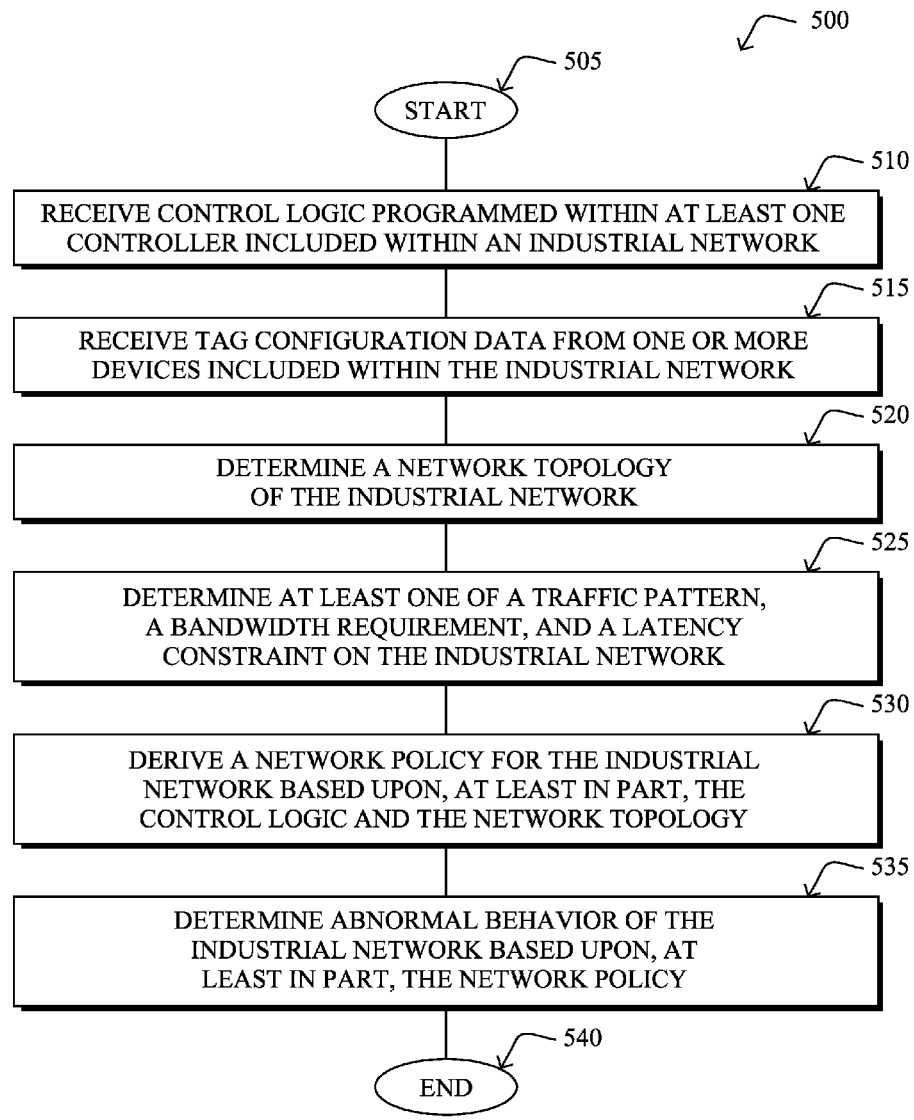
FIG. 5 illustrates another example simplified procedure for configuring the design of an industrial automation network.

As an additional (and more general) example, FIG. 5 illustrates an example simplified procedure for deriving a network policy for an industrial network in accordance with one or more embodiments described herein. The procedure 500 may start at step 505, and continues to step 510, where, as described in greater detail above, a centralized controller (or other supervisory device) receives control logic programmed within at least one controller included within an industrial network, and also receives tag configuration data from one or more devices included within the industrial network in step 515. Note that a tag I/O mapping table may thus be created based upon, at least in part, that tag configuration data. As mentioned above, the tag configuration data may include at least one of a tag name, a tag producer, a tag consumer, a location of the device within the industrial network generating the tag configuration data, a tag type, a tag value property, and so on.

In step 520, a network topology of the industrial network is determined, and then in step 525, an associated traffic pattern, bandwidth requirement, and latency constraint on the industrial network may also be determined. Accordingly, in step 530, the supervisory device derives a network policy for the industrial network based upon, at least in part, the control logic/tags and the network topology (e.g., deriving a QoS policy and/or security policy for the industrial network). In one embodiment, in step 535, abnormal behavior of the industrial network may be determined based upon, at least in part, the network policy. The simplified procedure 500 may end in step 540.

It should be noted that while certain steps within procedures 400-500 may be optional as described above, the steps shown in FIGS. 4A-5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400-500 are described separately, certain steps from each procedure may be incorporated into each other procedure, and the procedures are not meant to be mutually exclusive.

The techniques described herein, therefore, provide for deriving a network policy for an industrial automation network. In particular, the techniques have the following advantages compared to other existing network management systems for Industrial Network:

Converged IT and OT management—Network Management is no longer a separate task and doesn't require a different team of people;

Consistent IT and OT policy;

Consistent IT and OT operation; and

More secure because it eliminates any possible human error for configuring the network (e.g., and can help prevent "stuck net").

While there have been shown and described illustrative embodiments that provide for deriving a network policy for an industrial automation network, it is to be understood that various other adaptations and modifications may be made within the spirit and scope of the embodiments herein. For example, the embodiments have been shown and described herein with relation specifically to industrial networks. However, the embodiments in their broader sense are not as limited, and may, in fact, be used with other types of networks that may also benefit from the techniques herein, such as those with similar traffic requirements, traffic patterns, security considerations, etc. In addition, while certain protocols may have been mentioned and/or shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device, control logic programmed within at least one controller included within an industrial network;
   receiving, at the device, tag configuration data from one or more devices included within the industrial network, wherein the tag configuration data includes a tag name, a tag producer, a tag consumer, a location of a device within the industrial network generating the tag configuration data, a tag type, and a tag value property;
   creating, by the device, a tag input/output ("I/O") mapping table based upon, at least in part, the tag configuration data;
   discovering, by the device, a network topology of the industrial network;
   automatically deriving, by the device, a network policy for the industrial network based upon the discovered network topology, the control logic, and the tag input/output mapping table, wherein the network policy derived by the device accounts for at least a required Quality of Service (QoS) and traffic patterns in the industrial network, wherein deriving the network policy includes at least one of deriving a QoS policy for the industrial network, and deriving a security policy for the industrial network; and based on the derived network policy, configuring, by the device, one or more network elements in the industrial network, monitoring, by the device, network activity in the industrial network, and stopping any traffic from passing through the industrial network unless the traffic matches the derived network policy.

2. The method as in claim 1, further comprising:
   determining, by the device, at least one of a traffic pattern, a bandwidth requirement, and a latency constraint on the industrial network.

3. The method as in claim 1, further comprising:
   determining abnormal behavior of the industrial network based upon, at least in part, the network policy.

4. An apparatus, comprising:
   one or more network interfaces to communicate within an industrial network;
   a processor coupled to the network interfaces and adapted to execute one or more processes; and
   a memory configured to store a process executable by the processor, the process when executed operable to:
      receive control logic programmed within at least one controller included within the industrial network;
      receive tag configuration data from one or more devices included within the industrial network, wherein the tag configuration data includes a tag name, a tag producer, a tag consumer, a location of a device within the industrial network generating the tag configuration data, a tag type, and a tag value property;
      create a tag input/output ("I/O") mapping table based upon, at least in part, the tag configuration data;
      discover a network topology of the industrial network;
      automatically derive a network policy for the industrial network based upon the discovered network topology, the control logic, and the configuration associated with one or more devices in the industrial network, wherein the network policy derived by the device accounts for at least a required Quality of Service (QoS) and traffic patterns in the industrial network, wherein deriving the network policy includes at least one of deriving a QoS policy for the industrial network, and deriving a security policy for the industrial network; and based on the derived network policy, configuring one or more network elements in the industrial network, monitor network activity in the industrial network, and stop any traffic from passing through the industrial network unless the traffic matches the derived network policy.

5. The apparatus as in claim 4, wherein the process when executed is further operable to:
   determine at least one of a traffic pattern, a bandwidth requirement, and a latency constraint on the industrial network.

6. The apparatus as in claim 4, wherein the process when executed is further operable to:
   determine abnormal behavior of the industrial network based upon, at least in part, the network policy.

7. A tangible, non-transitory, computer-readable media having software encoded thereon, the software when executed by a processor operable to:
   receive control logic programmed within at least one controller included within an industrial network;
   receive tag configuration data from one or more devices included within the industrial network, wherein the tag configuration data includes a tag name, a tag producer, a tag consumer, a location of a device within the industrial network generating the tag configuration data, a tag type, and a tag value property;
   create a tag input/output ("I/O") mapping table based upon, at least in part, the tag configuration data;
   discover a network topology of the industrial network;
   automatically derive a network policy for the industrial network based upon the discovered network topology, the control logic, and a tag configuration associated with one or more devices in the industrial network, wherein the network policy derived by the device accounts for at least a required Quality of Service (QoS) and traffic patterns in the industrial network;

wherein deriving the network policy includes at least one of deriving a QoS policy for the industrial network, and deriving a security policy for the industrial network; and based on the derived network policy, configure one or more network elements in the industrial network, monitor network activity in the industrial network, and stop any traffic from passing through the industrial network unless the traffic matches the derived network policy.

8. The tangible, non-transitory, computer-readable media as in claim 7, wherein the software when executed is further operable to:

determine at least one of a traffic pattern, a bandwidth requirement, and a latency constraint on the industrial network.

9. The tangible, non-transitory, computer-readable media as in claim 7, wherein the software when executed is further operable to:

determine abnormal behavior of the industrial network based upon, at least in part, the network policy.

* * * * *